(12) United States Patent
Poscher et al.

(10) Patent No.: US 11,412,475 B2
(45) Date of Patent: Aug. 9, 2022

(54) TECHNIQUE FOR VERIFYING A GEOGRAPHICAL POSITION OF A UAV

(71) Applicant: Telefonaktiebolaget LM Ericsson (publ), Stockholm (SE)

(72) Inventors: Jens Poscher, Aachen (DE); Ralph Detke, Herzogenrath (DE); Stefan Eichinger, Pulheim (DE); Pedro Tercero, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/634,906

(22) PCT Filed: Sep. 14, 2017

(86) PCT No.: PCT/EP2017/073133
§ 371 (c)(1),
(2) Date: Jan. 29, 2020

(87) PCT Pub. No.: WO2019/052645
PCT Pub. Date: Mar. 21, 2019

(65) Prior Publication Data
US 2021/0099969 A1    Apr. 1, 2021

(51) Int. Cl.
*H04W 64/00* (2009.01)
*G01S 19/39* (2010.01)
(Continued)

(52) U.S. Cl.
CPC ......... *H04W 64/006* (2013.01); *B64C 39/024* (2013.01); *G01S 5/02521* (2020.05); *G01S 19/396* (2019.08); *H04W 8/08* (2013.01)

(58) Field of Classification Search
CPC ... H04W 8/08; H04W 64/006; G01S 5/02521; B64C 39/024
(Continued)

(56) References Cited

U.S. PATENT DOCUMENTS

2012/0082098 A1* 4/2012 Oprescu-Surcobe ........................ H04W 72/0406
370/329
2016/0225264 A1* 8/2016 Taveira ................ G08G 5/0013
(Continued)

FOREIGN PATENT DOCUMENTS

WO    2016154944 A1    10/2016

*Primary Examiner* — William Nealon
(74) *Attorney, Agent, or Firm* — Coats & Bennett, PLLC

(57) ABSTRACT

A technique for verifying a geographical position of an unmanned aerial vehicle, UAV, is disclosed. A computing unit for executing a UAV application server residing in a cellular network and configured to verify a geographical position of a UAV connected to the cellular network comprises at least one processor and at least one memory, wherein the at least one memory contains instructions executable by the at least one processor such that the UAV application server is operable to receive (S202) UAV-based position information indicative of a current geographical position of the UAV determined by the UAV, trigger (S204) obtaining, from at least one entity of the cellular network and based on information associated with the UAV available in the cellular network, network-based position information indicative of a current geographical position of the UAV, and trigger (S206) verifying the UAV-based position information based on the network-based position information.

19 Claims, 8 Drawing Sheets

(51) Int. Cl.
*G01S 5/02* (2010.01)
*B64C 39/02* (2006.01)
*H04W 8/08* (2009.01)

(58) Field of Classification Search
USPC .................................................. 455/456.1
See application file for complete search history.

(56) References Cited

U.S. PATENT DOCUMENTS

2017/0045884 A1* 2/2017 Kablaoui ................ H04L 67/10
2017/0057634 A1* 3/2017 Hunt .................... G08G 5/0082
2017/0332192 A1* 11/2017 Edge ..................... H04W 4/029
2018/0047295 A1* 2/2018 Ricci ..................... G05D 1/104

* cited by examiner

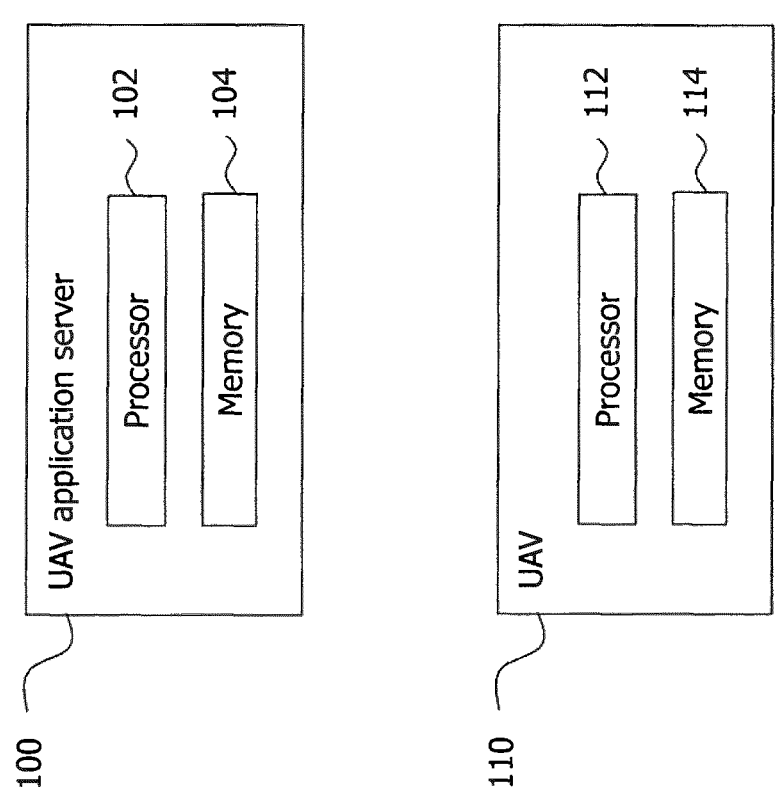

TECHNIQUE FOR VERIFYING A GEOGRAPHICAL POSITION OF A UAV

TECHNICAL FIELD

The present disclosure generally relates to the field of unmanned aerial vehicles (UAVs). In particular, a technique for verifying a geographical position of a UAV is presented. The technique may be embodied in apparatuses, systems, methods, and computer programs.

BACKGROUND

An unmanned aerial vehicle (UAV), commonly known as a drone, is an aircraft without a human pilot aboard whose flight may either be operated under remote control by a human operator or autonomously by onboard computers. Nowadays, UAVs have been adopted for a wide variety of applications. While, originally, UAVs have mainly been used for military applications, their use has rapidly been expanded to other applications over the recent years, including applications for surveillance, peacekeeping, scientific research and commercial uses, such as in agriculture, product deliveries in logistics, aerial photography, etc.

On flight, UAVs may be connected to application servers that are part of ground based control systems via communication systems, such as cellular networks. Application servers may be run by UAV manufacturers or other authorities for the purpose of controlling and tracing the UAVs, for example. Each UAV manufacturer or authority may run its own application server and UAVs can connect to these servers via default Internet connections over-the-top (OTT) of the cellular network. Although usage of UAVs is regulated in most countries, UAV usage cannot be monitored and enforced by central agencies, such as central flight regulation authorities, in order to restrict flight spaces or travel speeds and/or to manage flight paths, e.g., to provide secure travel corridors for delivery services.

The enforcement by central flight regulation authorities generally requires knowledge of a trusted geographical position of the UAV. Today, positioning data of a UAV is normally based on GPS data obtained by the UAV and this data is sent to the UAV application server for the purpose of tracking the UAV's flight path. There is generally a risk, however, that by faking or jamming the positioning data obtained by the UAV (e.g., the GPS data) the UAV can potentially be captured, sent anywhere else (without being noticed by the UAV application server) or even be destroyed. The UAV end user service may thus be disrupted.

SUMMARY

Accordingly, there is a need for a technique which avoids one or more of the problems discussed above, or other problems.

According to a first aspect, a computing unit for executing a UAV application server residing in a cellular network and configured to verify a geographical position of a UAV connected to the cellular network is provided. The computing unit comprises at least one processor and at least one memory, wherein the at least one memory contains instructions executable by the at least one processor such that the UAV application server is operable to (a) receive UAV-based position information indicative of a current geographical position of the UAV determined by the UAV, (b) trigger obtaining, from at least one entity of the cellular network and based on information associated with the UAV available in the cellular network, network-based position information indicative of a current geographical position of the UAV, and (c) trigger verifying the UAV-based position information based on the network-based position information.

The at least one entity of the cellular network may comprise a mobility management entity of the cellular network, wherein the network-based position information may correspond to positional information associated with the UAV stored by the mobility management entity. The positional information associated with the UAV may comprise at least one of a mobility tracking area associated with the UAV, a cell ID associated with the UAV, and a geographical position of a cell tower connected with the UAV. The at least one of the mobility tracking area and the cell ID may be mapped to a corresponding geographical position. The UAV application server may communicate with the mobility management entity over a dedicated interface provided in the cellular network between the UAV application server and the mobility management entity.

Alternatively or additionally, the at least one entity of the cellular network may comprise an on-demand positioning entity configured to determine a geographical position of the UAV on demand, wherein the network-based position information corresponds to the on-demand determined geographical position of the UAV. The UAV application server may communicate with the on-demand positioning entity over a dedicated interface provided in the cellular network between the UAV application server and the on-demand positioning entity.

The network-based position information provided by the on-demand positioning entity may have a higher precision than the network-based position information provided by the mobility management entity. Also, the mobility management entity may be used as a primary network-based positioning source and the on-demand positioning entity may be used as a secondary network-based positioning source employed when a precision of the network-based position information provided by the primary network-based positioning source is determined to be insufficient.

The at least one memory may further contain instructions executable by the at least one processor such that the UAV application server is operable to repeat steps (a) to (c) to continuously monitor a flight path of the UAV. Also, the at least one memory may contain instructions executable by the at least one processor such that the UAV application server is operable to trigger performing one or more corrective actions when the UAV-based position information is determined to be incorrect upon verifying the UAV-based position information. The one or more corrective actions may include at least one of sending a notification to an operator of the UAV, feeding the UAV with corrective positional information based on the obtained network-based position information, and controlling the UAV to correct a flight path of the UAV, prevent the UAV from entering a restricted flight space, keep a speed limit by the UAV, and/or land the UAV. The UAV application server may provide an interface allowing access to functions of the UAV application server to entities external to the cellular network.

According to a second aspect, a UAV connectable to a cellular network is provided. The UAV comprises at least one processor and at least one memory, wherein the at least one memory contains instructions executable by the at least one processor such that the UAV is operable to determine a current geographical position of the UAV, and send UAV-based position information indicative of the determined current geographical position of the UAV to a UAV application server residing in the cellular network to verify the UAV-based position information based on network-based position information indicative of a current geographical position of the UAV obtainable through information associated with the UAV available in the cellular network.

The UAV may correspond to the UAV described above in relation to the first aspect and may thus act complementary to the UAV application server executed by the computing unit according to the first aspect. As such, those aspects described with regard to the UAV and the UAV application server in relation to the first aspect which are applicable to the UAV and the UAV application server according to the second aspect may be comprised by the second aspect as well, and vice versa. Unnecessary repetitions are thus omitted.

The at least one memory may further contain instructions executable by the at least one processor such that the UAV is operable to obtain access information for accessing the UAV application server from the cellular network when the UAV connects to the cellular network. Also, the at least one memory may contain instructions executable by the at least one processor such that the UAV is operable to receive, when the UAV-based position information is determined to be incorrect upon verifying the UAV-based position information by the UAV application server, corrective positional information based on the network-based position information. Alternatively or additionally, the at least one memory may contain instructions executable by the at least one processor such that the UAV is operable to receive, when the UAV-based position information is determined to be incorrect upon verifying the UAV-based position information by the UAV application server, one or more instructions for controlling the UAV to correct a flight path of the UAV, prevent the UAV from entering a restricted flight space, keep a speed limit by the UAV, and/or land the UAV.

According to a third aspect, a system comprising a UAV application server of the first aspect and a UAV of the second aspect is provided.

According to a fourth aspect, a method for verifying a geographical position of a UAV connected to a cellular network is provided. The method is performed by a UAV application server residing in the cellular network and comprises receiving UAV-based position information indicative of a current geographical position of the UAV determined by the UAV, triggering obtaining, from at least one entity of the cellular network and based on information associated with the UAV available in the cellular network, network-based position information indicative of a current geographical position of the UAV, and triggering verifying the UAV-based position information based on the network-based position information.

According to a fifth aspect, a method for verifying a geographical position of a UAV connected to a cellular network is provided. The method is performed by the UAV and comprises determining a current geographical position of the UAV, and sending UAV-based position information indicative of the determined current geographical position of the UAV to a UAV application server residing in the cellular network to verify the UAV-based position information based on network-based position information indicative of a current estimated geographical position of the UAV obtainable through information associated with the UAV available in the cellular network.

The apparatus features described herein with reference to the first and second aspects may also be embodied as functions, services or steps in the methods of the fourth and fifth aspects.

According to a sixth aspect, a computer program product is provided. The computer program product comprises program code portions for performing the method of at least one of the fourth and fifth aspect when the computer program product is executed on one or more computing devices. The computer program product may be stored on a computer readable recording medium, such as a semiconductor memory, DVD, CD-ROM, and so on. The computer program product may also be provided for download via a communication network (e.g., the Internet or a proprietary network).

BRIEF DESCRIPTION OF THE DRAWINGS

Implementations of the technique presented herein are described herein below with reference to the accompanying drawings, in which:

FIGS. 1a and 1b illustrate an exemplary composition of a computing unit configured to execute a UAV application server according to the present disclosure and an exemplary composition of a UAV according to the present disclosure;

DETAILED DESCRIPTION

Figure 2A:
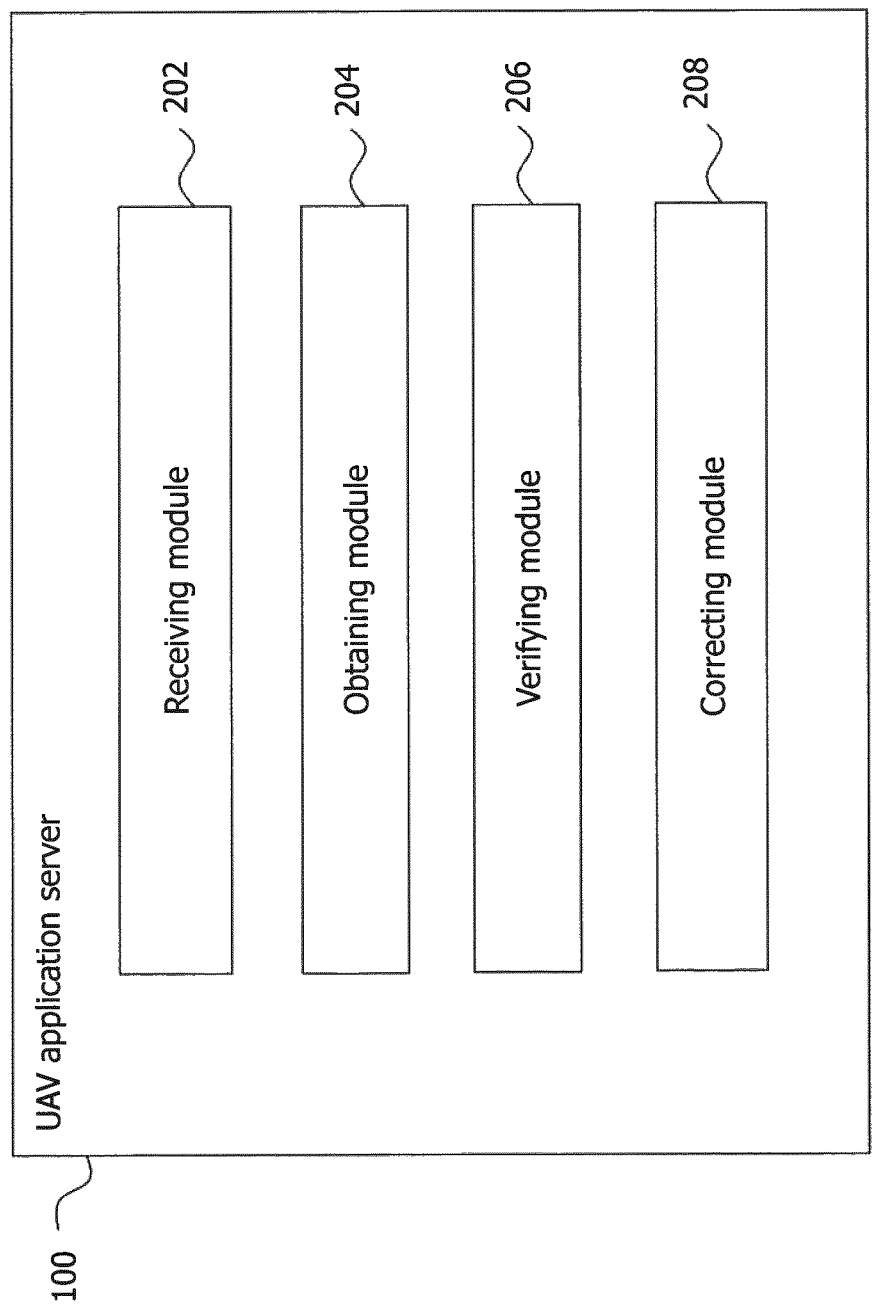
FIGS. 2a and 2b illustrate a modular composition of a computing unit configured to execute a UAV application server according to the present disclosure and a corresponding method which may be performed by the UAV application server.

In the following description, for purposes of explanation and not limitation, specific details are set forth in order to provide a thorough understanding of the present disclosure. It will be apparent to one skilled in the art that the present disclosure may be practiced in other implementations that depart from these specific details. For example, while the following implementations will be described with regard to LTE and 5G architectures, it will be understood that the present disclosure shall not be limited to these architectures and that the technique presented herein may be practiced with other cellular network architectures as well.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

FIG. 1a schematically illustrates an exemplary composition of a computing unit which is configured to execute a UAV application server 100 residing in a cellular network and configured to verify a geographical position of a UAV connected to the cellular network. The computing unit comprises at least one processor 102 and at least one memory 104, wherein the at least one memory 104 contains instructions executable by the at least one processor 102 such that the UAV application server 100 is operable to carry out the method steps described herein below. It will be understood that the computing unit for executing the UAV application server 100 may be a physical computing unit as well as a virtualized computing unit, such as a virtual machine, for example. It will further be appreciated that the computing unit may not necessarily be implemented as a standalone computing unit, but may be implemented as components—realized in software and/or hardware—residing on multiple distributed computing units as well.

FIG. 1b schematically illustrates an exemplary composition of a UAV 110 which is connectable to the cellular network. The UAV 110 comprises at least one processor 112 and at least one memory 114, wherein the at least one memory 114 contains instructions executable by the at least one processor 114 such that the UAV 110 is operable to carry out the method steps described herein below.

Figure 2B:
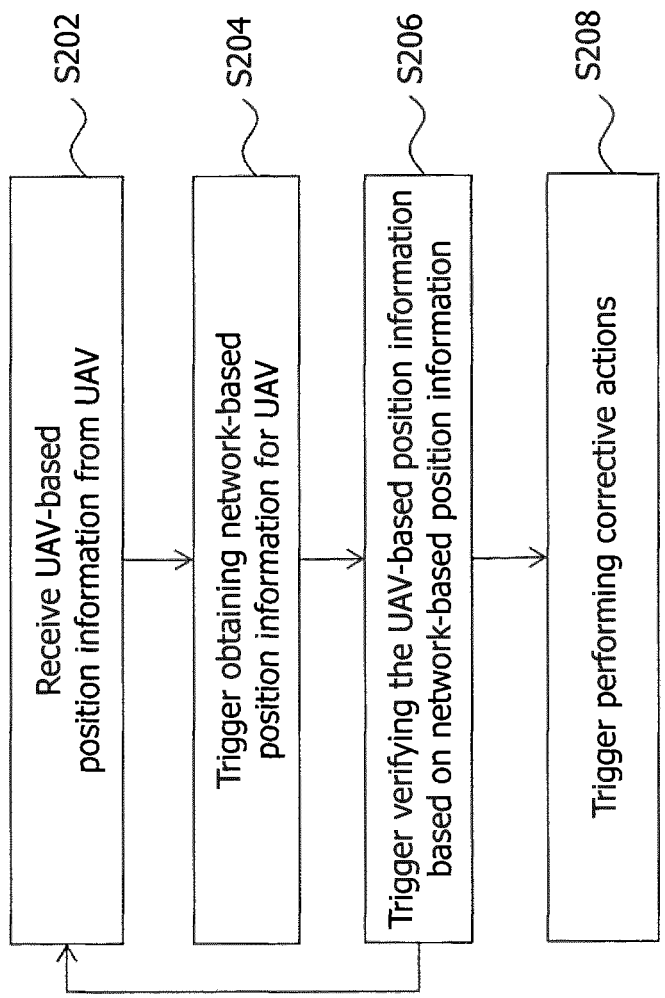

FIG. 2a schematically illustrates an exemplary modular composition of the computing unit which is configured to execute the UAV application server 100 and FIG. 2b illustrates a corresponding method which may be performed by the UAV application server 100. The basic operation of the UAV application server 100 will be described in the following with reference to both FIGS. 2a and 2b.

In step S202, a receiving module 202 of the UAV application server 100 may (a) receive UAV-based position information indicative of a current geographical position of the UAV determined by the UAV. In step S204, an obtaining module 204 of the UAV application server 100 may (b) trigger obtaining, from at least one entity of the cellular network and based on information associated with the UAV available in the cellular network, network-based position information indicative of a current geographical position of the UAV and, in step S206, a verifying module 206 of the UAV application server 100 may (c) trigger verifying the UAV-based position information based on the network-based position information.

The cellular network to which the UAV 110 is connected may be a mobile communication network, such as an LTE network or a 5G network, for example. The UAV application server 100 may reside in the cellular network and may be under the administrative domain of the operator of the cellular network. The UAV application server may thus be said to be an entity of the cellular network or, in other words, to form part of the cellular network. Communication between the UAV 110 and the UAV application server 100 may not be carried out over-the-top (OTT) of the cellular network using a default Internet connection, but rather via a cellular network based interface, e.g., via a dedicated transport bearer provided by the cellular network. In case of an LTE network, for example, the transport bearer may be a dedicated Radio Access Bearer (RAB) provided by the Packet Data Network Gateway (PDN GW) to which the UAV 110 is connected.

The UAV application server 100 may be an entity that manages (e.g., monitors and/or controls) one or more UAVs connected to the cellular network (including the UAV 110) during their operation, such as during their flight. For example, the UAV application server 100 may receive positioning data from one or more UAVs connected to the cellular network, track the flight paths of the UAVs and control the UAVs as needed. The UAV application server 100 may be assigned to the UAV 110 when the UAV 110 connects to the cellular network. In particular, the UAV application server 100 may be configured to verify a geographical position of the UAV 110 in order to obtain trusted geographical positioning data of the UAV 110 which may be tamperproof against impermissible modification of the positioning data determined by the UAV (e.g., jamming the GPS data obtained by the UAV 110). For this purpose, the UAV application server 100 may perform a network-based verification of the positional information received from the UAV 110 using a second positioning source available in the cellular network.

Again, the UAV application server 100 may—according to the above-mentioned step (a)—receive UAV-based position information indicative of a current geographical position of the UAV 110 determined by the UAV 110. The UAV-based position information may correspond to positioning information obtained by the UAV 110, such as GPS data obtained by the UAV 110 itself, for example. Further, the UAV application server 100 may—according to the above-mentioned step (b)—obtain, from at least one entity of the cellular network and based on information associated with the UAV 110 available in the cellular network, network-based position information indicative of a current geographical position of the UAV 110. The at least one entity of the cellular network may be used as a second positioning source against which the UAV-based position information may be verified. The UAV application server 100 may thus—according to the above-mentioned step (c)—verify the UAV-based position information based on the obtained network-based position information.

Verifying the UAV-based position information based on the network-based position information may comprise determining whether the UAV-based position information is correct (e.g., at least with a certain likelihood). This determination may involve comparing the UAV-based position information with the network-based position information and, when a difference between the UAV-based position information and the network-based position information is below a predetermined threshold, the UAV-based position information may be determined to be correct (i.e., reliable or trustworthy). Otherwise, when a difference between the UAV-based position information and the network-based position information exceeds the predetermined threshold, the UAV-based position information may be determined to be incorrect (i.e., unreliable or untrustworthy).

The network-based position information may be obtained based on information associated with the UAV 110 available in the cellular network. This information may either correspond to information indicative of an approximated geographical position of the UAV 110 stored by the at least one entity of the cellular network or it may be actively determined by the at least one entity of the cellular network, e.g., using cell-based positioning techniques, like triangulation.

In one variant, the at least one entity of the cellular network may comprise a mobility management entity of the cellular network. The network-based position information may in this case correspond to positional information associated with the UAV 110 stored by the mobility management entity. The mobility management entity may be an entity of the cellular network which supports mobility tracking of the UAV 110 in the cellular network. More specifically, the mobility management entity may keep track of a mobility tracking area and a cell in which the UAV 110 is currently located and store additional information about these areas and cells, such as corresponding IDs, geographical areas associated therewith as well as geographical positions of cell towers (i.e., antenna masts) in these cells, for example. The positional information associated with the UAV 110 may in this case comprise at least one of a mobility tracking area associated with the UAV 110 (e.g., a mobility tracking area in which the UAV 110 is currently located), a cell ID associated with the UAV 110 (e.g., an ID of a cell in which the UAV 110 is currently located), and a geographical position of a cell tower connected with the UAV (i.e., a cell tower which is in the cell in which the UAV 110 is currently located). Since a mobility tracking area and a cell may correspond to whole geographical areas, at least one of the mobility tracking area and the cell ID may be mapped to a corresponding geographical position, e.g., representing an approximated geographical position of the UAV 110. For example, the mobility tracking area and the cell may be translated into a geographical position representing the center of the respective geographical area. The mapping may include a database lookup based on the mobility tracking area and/or the cell ID performed by at least one of the mobility management entity and the UAV application server, for example. When the cellular network is an LTE network, the mobility management entity may correspond to a Mobility Management Entity (MME) and the mobility tracking area may correspond to a Tracking Area (TA) associated with the UAV 110. In case of a 5G network, the mobility management entity may correspond to an Access and Mobility Function (AMF), for example.

Alternatively or additionally, the at least one entity of the cellular network may comprise an on-demand positioning entity configured to determine a geographical position of the UAV 110 on demand. The network-based position information may in this case correspond to the on-demand determined geographical position of the UAV 110. Determining the geographical position of the UAV 110 by the on-demand positioning entity may comprise actively determining the geographical position of the UAV 110 using cell-based positioning techniques, such as triangulation, for example. When the cellular network is an LTE network, the on-demand positioning entity of the cellular network may correspond to a Gateway Mobile Location Center (GMLC), for example. In 5G networks, the on-demand positioning entity may correspond to an entity supporting similar functionality as a GMLC.

As an entity of the cellular network, the UAV application server 100 may be required to communicate with other entities of the cellular network, including the at least one entity of the cellular network from which the network-based position information is obtained. In case the at least one entity of the cellular network comprises the mobility management entity, the UAV application server 100 may communicate with the mobility management entity over a dedicated interface provided in the cellular network between the UAV application server 100 and the mobility management entity. In case the at least one entity of the cellular network comprises the on-demand positioning entity, the UAV application server 100 may communicate with the on-demand positioning entity over a dedicated interface provided in the cellular network between the UAV application server 100 and the on-demand positioning entity. At least one of these interfaces may be implemented using the DIAMETER protocol, for example.

It will be understood from the foregoing that the mobility management entity and the on-demand positioning entity of the cellular network may provide the network-based position information with different accuracy. In particular, the network-based position information provided by the on-demand positioning entity may have a higher precision than the network-based position information provided by the mobility management entity. This may be due to the fact that the on-demand positioning entity may perform an on-demand determination using cell-based position techniques to obtain a precise geographical position of the UAV 110, whereas the positional information available through the mobility management entity may correspond to less precise (i.e., approximated) positioning data since a mobility tracking area or a cell in which the UAV 110 is currently located corresponds to a whole geographical area rather than an exact geographical position. The same applies to a geographical position of a cell tower connected with the UAV 110 since the geographical position of the cell tower does not necessarily correspond to the exact position of the UAV 110, but rather to an approximated position.

On the other hand, it will be understood that the network-based position information provided by the mobility management entity may be provided in a faster manner than the network-based position information provided by the on-demand positioning entity. In particular, the network-based information provided by the mobility management entity may be provided in (near) real-time, even for a large number of UAVs, because this information is already available in the mobility management entity and does not require expensive additional computations. The provision of the network-based position information provided by the on-demand positioning entity, on the other hand, may require expensive computations (e.g., for carrying out positioning techniques like triangulation) and may therefore be available on demand.

In an implementation that takes these characteristics into account, the mobility management entity may be used as a primary network-based positioning source and the on-demand positioning entity may be used as a secondary network-based positioning source employed when a precision of the network-based position information provided by the primary network-based positioning source is determined to be insufficient. In this case, verifying the UAV-based position information according to the above-mentioned step (c) may comprise verifying, in a first phase, the UAV-based position information based on the network-based position information provided by the mobility management entity and, in case the precision of the network-based position information obtained in the first phase is insufficient (e.g., when the geographical area of the mobility tracking area or the cell in which the UAV is currently located is too large, or when the verification of the UAV-based position information fails because the difference between the UAV-based position information and the network-based position information exceeds the predetermined threshold), verifying, in a second phase, the UAV-based position information based on the network-based position information provided by the on-demand positioning entity, e.g., in order to confirm or disprove the verification result of the first phase.

As the UAV 110 may be configured to follow a flight path autonomously, the UAV application server 100 may use the verification procedure in order to track the actual flight path of the UAV 110. The UAV application server 100 may thus be operable to repeat the above-mentioned steps (a) to (c), i.e., steps S202, S204 and S206, to continuously monitor a flight path of the UAV 110. In particular, the repetitions may be performed in predefined intervals so that the UAV-based position information is always verified against up-to-date network-based position information. Alternatively or additionally, obtaining the network-based position information according to step (b) may be triggered each time the UAV application server 100 receives UAV-based position information from the UAV 110.

If the verification of the geographical position of the UAV 110 fails at some point of the flight path of the UAV 110, e.g., when the UAV-based position information is determined to be incorrect (i.e., unreliable, untrustworthy or jammed/modified, respectively), one or more corrective actions may be taken. Thus, in step S208, a correcting module 208 of the UAV application server 100 may trigger performing one or more corrective actions when the UAV-based position information is determined to be incorrect upon verifying the UAV-based position information. In particular, the one or more corrective actions may include at least one of sending a notification to an operator of the UAV 110, feeding the UAV 110 with corrective positional information based on the obtained network-based position information, and controlling the UAV 110. Such controlling may comprise controlling the UAV 110 to perform at least one of correcting a flight path of the UAV 110, preventing the UAV 110 from entering a restricted flight space, keeping a speed limit by the UAV 110, and landing the UAV 110.

The notification may be an alarm informing the operator of the UAV 110 or another third party of the failed verification and leave further corrective actions to the UAV operator or the third party. The UAV application server 100 may provide an interface (e.g. via an API) allowing access to the functions of the UAV application server 100 to entities external to the cellular network for this purpose (e.g., to the UAV operator or another third-party). Feeding the UAV 110 with corrective positional information may be performed when the UAV 110 has lost its GPS signal and may serve for the purpose of assisting the UAV 110 in positioning. Such action may also be reported to the operator of the UAV 110 or another third party. The interface provided by the UAV application server 100 may further be used when the UAV 110 does not send UAV-based position information to the UAV application server 100 at all (e.g., due to a fault/loss/crash of the UAV 110 or active deactivation of the position information by the UAV 110). The network-based position information may then be the only positioning data of the UAV 110 available which may be made accessible to the operator of the UAV 110 or another third party via the interface. The above-mentioned corrective control actions may be triggered by the UAV application server 100 itself and may include taking over control of the UAV 110, e.g., when the UAV 110 enters a restricted flight area or exceeds a current speed limit. Further to the UAV application server 100 itself, the corrective control actions may also be triggered by the operator of the UAV 110 or another third party via the interface. Still further, the corrective control actions may be triggered by a central agency having control of the UAV application server 100, such as a central flight regulation authority, for example.

Figure 3A:
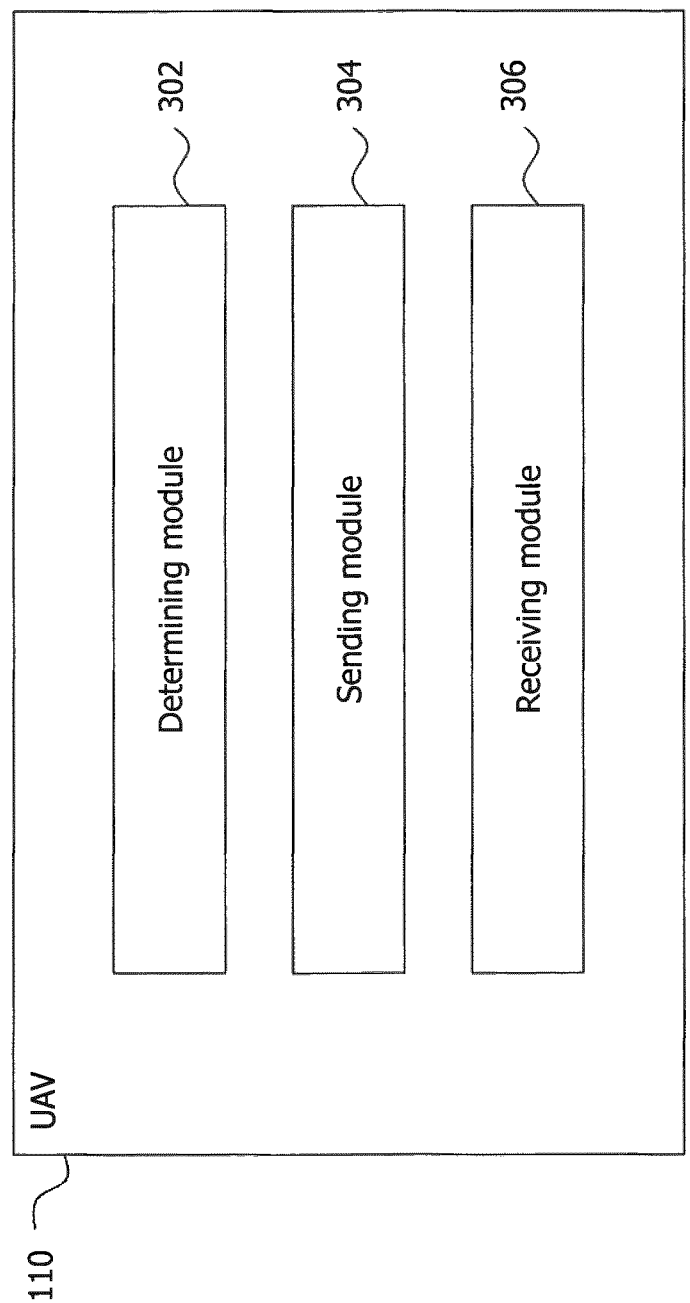
FIGS. 3a and 3b illustrate a modular composition of a UAV according to the present disclosure and a corresponding method which may be performed by the UAV.
Figure 3B:
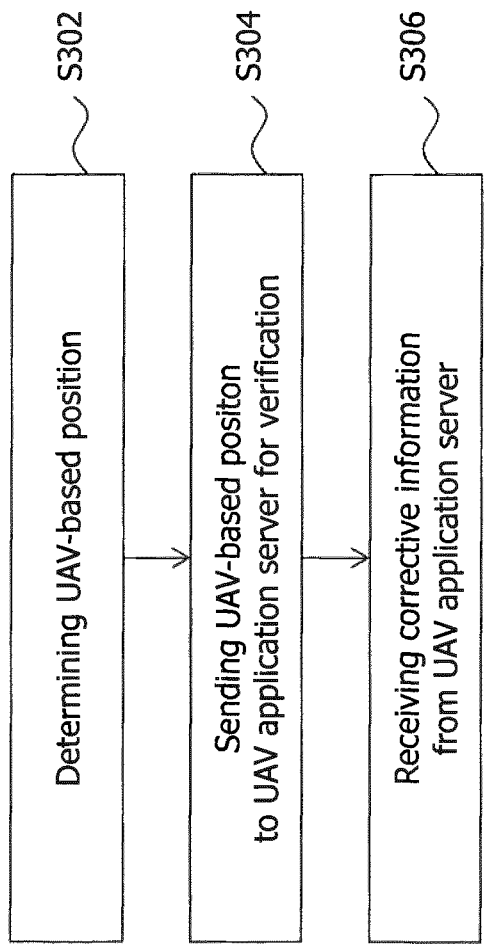

FIG. 3a schematically illustrates an exemplary modular composition of the UAV 110 and FIG. 3b illustrates a corresponding method which may be performed by the UAV 110. The basic operation of the UAV 110 will be described in the following with reference to both FIGS. 3a and 3b. This operation may be complementary to the operation of the UAV application server 100 described above in relation to FIGS. 2a and 2b and, as such, aspects described above with regard to the UAV 110 may be applicable to the UAV 110 described in the following as well. Unnecessary repetitions are thus omitted.

In step S302, a determining module 302 of the UAV 110 may determine a current geographical position of the UAV 110 and, in step S304, a sending module 304 of the UAV 110 may send UAV-based position information indicative of the determined current geographical position of the UAV 110 to the UAV application server 100 residing in the cellular network to verify the UAV-based position information based on network-based position information indicative of a current geographical position of the UAV 110 obtainable through information associated with the UAV 110 available in the cellular network.

Before sending the UAV-based position information (e.g., GPS data obtained by the UAV 110) to the UAV application server 100, the UAV 110 may need to obtain access information for accessing the UAV application server 100. The UAV 110 may thus be operable to obtain access information for accessing the UAV application server 100 from the cellular network when the UAV connects to the cellular network. More specifically, the UAV 110 may comprise a cellular modem which, e.g., when the UAV 110 is turned on, scans for the cellular network. Once the UAV 110 identifies the cellular network, the UAV 110 may connect to the cellular network using regular cellular network registration procedures (e.g., using the standard LTE/5G attach procedure) and receive the access information as part of this registration procedure. The access information may comprise a network address of the UAV application server 100, such as an IP address of the UAV application server 100, for example. Once available, the access information may be used by the UAV 110 to register itself at the UAV application server 100. Communication between the UAV 110 and the UAV application server 100 may be carried out using the cellular network based interface mentioned above in relation to FIGS. 2a and 2b, e.g., a dedicated transport bearer provided by the cellular network. In the cellular network, the UAV application server 100 may be assigned to the UAV 110 when the UAV 110 connects to the cellular network.

As mentioned above, the UAV application server 100 may trigger performing one or more corrective actions when the UAV-based position information is determined to be incorrect upon verifying the UAV-based position information. For carrying out such corrective actions, in step S306, a receiving module 306 of the UAV 110 may receive, when the UAV-based position information is determined to be incorrect upon verifying the UAV-based position information by the UAV application server 100, corrective positional information based on the network-based position information. Alternatively or additionally, the receiving module 306 of the UAV 110 may receive, when the UAV-based position information is determined to be incorrect upon verifying the UAV-based position information by the UAV application server, one or more instructions for controlling the UAV 110 to perform at least one of correcting a flight path of the UAV 110, preventing the UAV 110 from entering a restricted flight space, keeping a speed limit by the UAV 110, and landing the UAV 110.

Figure 4A:
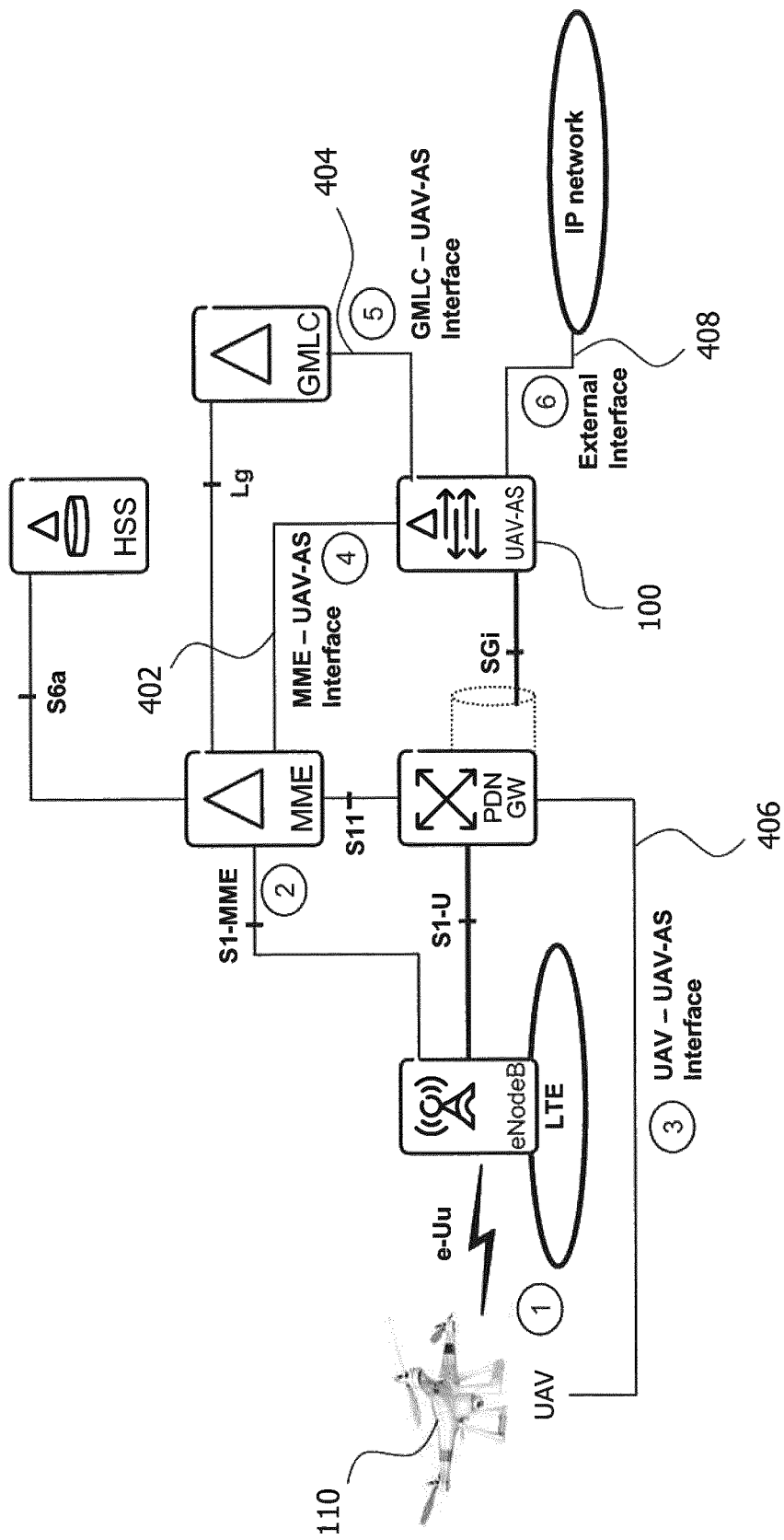
FIGS. 4a and 4b illustrate exemplary cellular network architectures (LTE and 5G) including a UAV and a UAV application server according to the present disclosure.

FIG. 4a schematically illustrates a simplified LTE architecture in which the technique for verifying a geographical position of the UAV 110 disclosed herein may be practiced. As common LTE architectures, the architecture shown in FIG. 4a comprises an eNodeB through which the UAV 110 may connect to the cellular network using an e-Uu interface. The eNodeB connects to an MME for control plane support using an S1-MME interface and to a PDN GW for user plane support (i.e., for user data transfer) using an S1-U interface. The MME, in turn, is connected to a Home Subscriber Service (HSS) containing user-related and subscription-related information via an S6a interface. The illustrated architecture further comprises a GMLC comprising functionality to support Location-based Services (LBS) and functioning as an on-demand positioning entity for the purpose of the technique presented herein. The GMLC is connected to the MME using an Lg interface. It will be understood by the skilled person that the architecture shown in FIG. 4a corresponds to a simplified LTE architecture in which only those components that are necessary for the purpose of elucidating the technique presented herein are shown.

In addition to the above-described common entities of an LTE network, the architecture illustrated in FIG. 4a further comprises the UAV application server 100 (denoted as "UAV-AS" in the figure) as part of the cellular network. The UAV application server 100 connects to the PDN GW through an SGi interface. Further, to be able to communicate directly with the MME and the GMLC, i.e., the entities of the cellular network from which the network-based position information may be obtained, the UAV application server 100 connects to the MME using a dedicated interface 402 provided between the UAV application server 100 and the MME and to the GMLC using a dedicated interface 404 provided between the UAV application server 100 and the GMLC. The interfaces 402 and 404 may be implemented using the DIAMETER protocol, for example. For communication between the UAV application server 100 and the UAV 110, a cellular network based interface 406, e.g., a dedicated transport bearer, such as a dedicated RAB, may be provided by the PDN GW. Further, the UAV application server 100 supports an external interface 408 which allows access to functions of the UAV application server 100 to entities external to the cellular network, such as entities accessing the UAV application server 100 from the Internet, for example.

In FIG. 4a, circled numbers 1 to 6 indicate procedural steps which may be performed when the UAV 110 is turned on. At step (1), the UAV 110 is powered on and scans for the cellular network. At step (2), when the UAV 110 identifies the cellular network, the UAV may connect to the cellular network using regular network registration procedures (e.g., using the standard LTE attach procedure involving the MME and the PDN GW) and receive an IP address of the UAV application server 100 as part of the registration procedure. During this procedure, the UAV 110 may also be registered as subscriber in the HSS, for example. At step (3), the UAV 110 may register itself at the UAV application server 100 using interface 406. At step (4), the UAV application server 100 may register at the MME using interface 402 and may establish a context binding to the UAV 110 in the MME. Interface 402 may also be used later by the UAV application server 100 to request (near) real-time position information for the UAV 110 from the MME, as described above. Similarly, at step (5), the UAV application server 100 may register at the GMLC using interface 404 and may establish a context binding to the UAV 110 in the GMLC. Interface 404 may be used by the UAV application server 100 to request accurate position information for the UAV 110 from the GMLC based on network procedures like triangulation, as described above. Finally, at step (6), the UAV application server 100 may establish an interface (e.g., an Application Programming Interface, API) to entities external to the cellular network providing access to the positioning, verification, notification and control functions of the UAV application server 100.

Figure 4B:
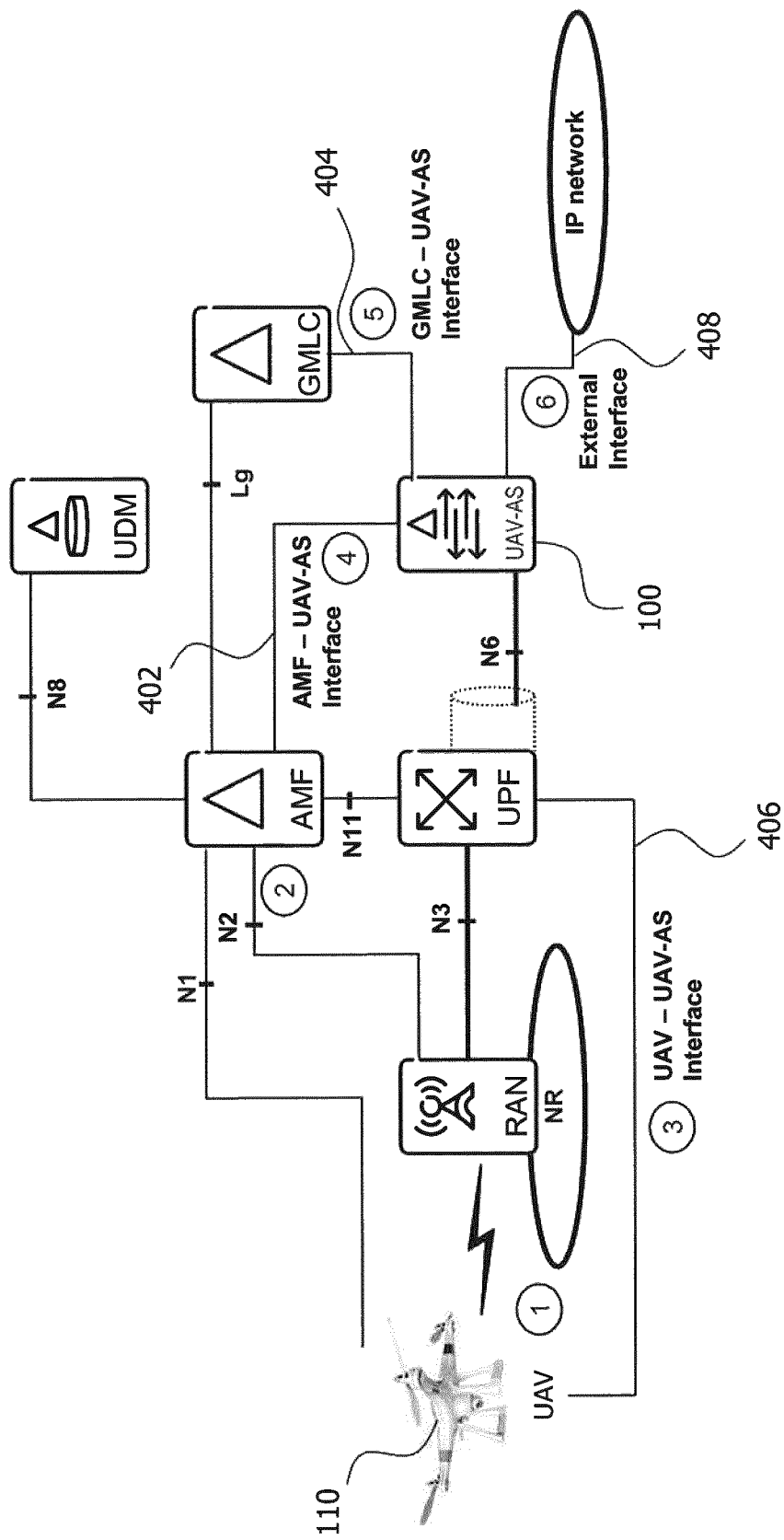

Similar to FIG. 4a, FIG. 4b schematically illustrates a simplified 5G architecture in which the technique for verifying a geographical position of a UAV disclosed herein may be practiced. The architecture shown in FIG. 4b corresponds to a 5G variant of the architecture described in relation to FIG. 4a. The basic principles for practicing the technique presented herein may equally apply to the 5G architecture of FIG. 4b. Unnecessary repetitions are thus omitted in the following. Only, it is noted that the functions described above for the eNodeB, the MME, the PDN GW and the HSS may in this case be performed by corresponding functions of the 5G architecture, i.e., the Radio Access Network (RAN), the AMF, the User Plane Function (UPF) and the User Data Management (UDM), respectively. The GMLC is equally denoted as GMLC in the 5G architecture. It will be understood, however, that any other entity which may be defined for 5G architectures in the future and which supports similar functionality as the GMLC (in particular on-demand positioning) may be used instead.

Figure 5:
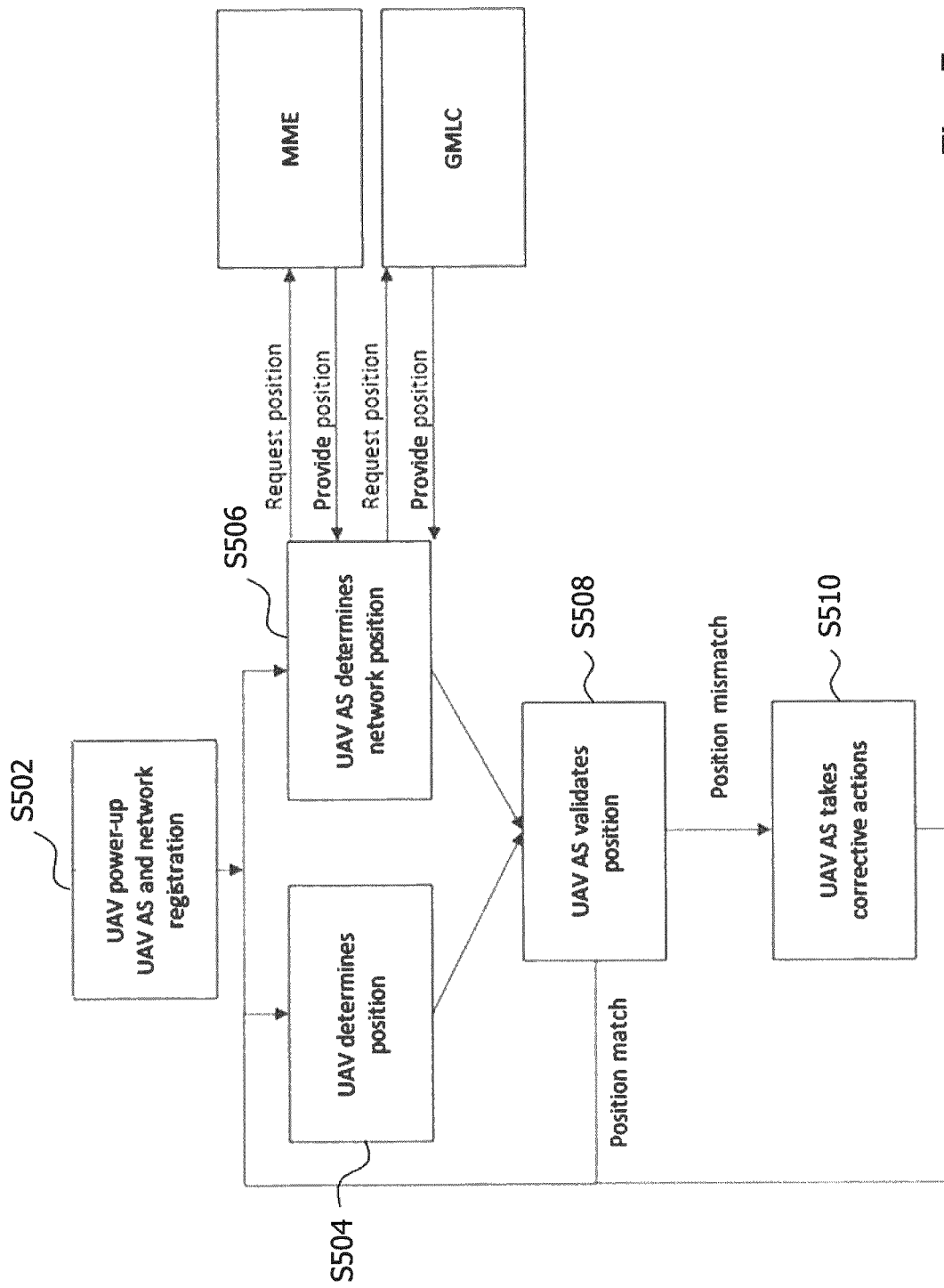
FIG. 5 illustrates an exemplary geographical position verification procedure performed in a system comprising a UAV and a UAV application server according to the present disclosure.

FIG. 5 illustrates an exemplary verification procedure for verifying the geographical position of the UAV 110 in a system comprising the UAV 110 and the UAV application server 100 (in the example of an LTE network). At step S502, the UAV 110 may be powered on and registered as subscriber in the cellular network and the UAV application server 100. Then, the UAV 110 and a UAV application server 100 may determine the current geographical position of the UAV 110 in parallel in steps S504 and S506. Among these steps, step S506 may include two phases. In a first phase, the UAV application server 100 may request the current position of the UAV from the MME and, in response, the MME may provide positional information for the UAV 110 which may include a TA and/or a cell ID, for example. The TA and the cell ID may be translated into a geographical position through a database lookup that maps the corresponding geographical area to an approximate a geographical position. If it is concluded by the UAV application server 100 that the positional information provided by the MME is not precise enough, e.g., because the geographical area corresponding to the TA or the cell ID is too large (or due to other reasons), the UAV application server 100 may obtain more precise position information from the GMLC in a second phase. Afterwards, at step S508, the UAV application server 100 may check whether the position information determined by the UAV 110 matches the position information determined in the cellular network (this check may take into consideration a predetermined difference/distance threshold, as described above). In case the UAV application server 100 concludes that the position information determined by the UAV 110 is correct (i.e., the position information determined by the UAV 110 matches the position information determined in the cellular network), the positioning procedure may continue with steps S504 and S506 after a predefined interval. On the other hand, in case the UAV application server 100 concludes that the position information determined by the UAV 110 is incorrect (i.e., the position information determined by the UAV 110 mismatches the position information determined in the cellular network), the UAV application server may perform, in step S510, one or more corrective actions, as described above.

As has become apparent from the above, the present disclosure provides a technique for verifying a geographical position of a UAV connected to a cellular network. The technique presented herein may be used obtain a trusted geographical position of the UAV, i.e., a geographical position of the UAV which is neither faked, jammed or otherwise impermissibly modified. By the presented technique, a trusted geographical position of the UAV may always be available (e.g., even when the UAV cells has no GPS signal) and the geographical position of the UAV may always be accurate due to the verification by a second positioning source available in the cellular network (being a trusted network). The presented technique may be suitable to enable enforcement of flight regulations by central agencies, such as trusted flight regulation authorities, which may enforce policies, such as not entering a restricted flight space or keeping a speed limit, for example. Further, the presented technique may enable triggering corrective procedures, such as correcting the UAV flight path by the network-based information or triggering alarms etc., thereby providing an additional protective mechanism for the handling of UAV-based flight paths. Finally, it will be understood that the trusted geographical position of the UAV can also be used for various other applications, such as for predicting, using a flight path vector of the UAV, the next cell to connect to in predefined time intervals, for example.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A computing unit for executing an unmanned aerial vehicle (UAV) application server residing in a cellular network and configured to verify a geographical position of a UAV connected to the cellular network, the computing unit comprising:
   processing circuitry;
   memory containing instructions executable by the processing circuitry whereby the UAV application server is operative to:
   (a) receive UAV-based position information indicative of a current geographical position of the UAV determined by the UAV;
   (b) trigger obtaining, from at least one entity of the cellular network and based on information associated with the UAV available in the cellular network, network-based position information indicative of a current geographical position of the UAV; and
   (c) trigger verification of the UAV-based position information based on a difference between the UAV-based position information and the network-based position information.

2. The computing unit of claim 1:
   wherein the at least one entity of the cellular network comprises a mobility management entity of the cellular network; and
   wherein the network-based position information corresponds to positional information associated with the UAV stored by the mobility management entity.

3. The computing unit of claim 2, wherein the positional information associated with the UAV comprises a mobility tracking area associated with the UAV, a cell ID associated with the UAV, and/or a geographical position of a cell tower connected with the UAV.

4. The computing unit of claim 3, wherein the mobility tracking area and/or the cell ID is mapped to a corresponding geographical position.

5. The computing unit of claim 1, wherein the UAV application server communicates with a mobility management entity of the cellular network over a dedicated interface provided in the cellular network between the UAV application server and the mobility management entity.

6. The computing unit of claim 1:
   wherein the at least one entity of the cellular network comprises an on-demand positioning entity configured to determine a geographical position of the UAV on demand; and
   wherein the network-based position information corresponds to the on-demand determined geographical position of the UAV.

7. The computing unit of claim 6, wherein the UAV application server communicates with the on-demand positioning entity over a dedicated interface provided in the cellular network between the UAV application server and the on-demand positioning entity.

8. The computing unit of claim 6, wherein the network-based position information provided by the on-demand positioning entity is configured with a higher precision than the network-based position information provided by the mobility management entity.

9. The computing unit of claim 6, wherein a mobility management entity is configured as a primary network-based positioning source and the on-demand positioning entity is configured as a secondary network-based positioning source and employed when a precision of the network-based position information provided by the primary network-based positioning source is determined to be insufficient.

10. The computing unit of claim 1, wherein the instructions are such that the UAV application server is operable to repeat steps (a) to (c) to continuously monitor a flight path of the UAV.

11. The computing unit of claim 1, wherein the instructions are such that the UAV application server is operable to trigger performing one or more corrective actions when the UAV-based position information is determined to be incorrect upon verifying the UAV-based position information.

12. The computing unit of claim 11, wherein the one or more corrective actions include:
   sending a notification to an operator of the UAV;
   feeding the UAV with corrective positional information based on the obtained network-based position information;
   controlling the UAV to correct a flight path of the UAV;
   controlling the UAV to prevent the UAV from entering a restricted flight space;
   controlling the UAV to keep a speed limit by the UAV; and/or
   controlling the UAV to land the UAV.

13. The computing unit of claim 1, wherein the UAV application server provides an interface allowing access to functions of the UAV application server to entities external to the cellular network.

14. An unmanned aerial vehicle (UAV) connectable to a cellular network, the UAV comprising:
   processing circuitry;
   memory containing instructions executable by the processing circuitry whereby the UAV is operative to:
   determine a current geographical position of the UAV; and
   send UAV-based position information indicative of the determined current geographical position of the UAV to a UAV application server residing in the cellular network to verify the UAV-based position information based on a difference between the UAV-based position information and network-based position information indicative of a current geographical position of the UAV obtainable through information associated with the UAV available in the cellular network.

15. The UAV of claim 14, wherein the instructions are such that the UAV is operable to obtain access information for accessing the UAV application server from the cellular network when the UAV connects to the cellular network.

16. The UAV of claim 14, wherein the instructions are such that the UAV is operable to receive, when the UAV-based position information is determined to be incorrect upon verifying the UAV-based position information by the UAV application server, corrective positional information based on the network-based position information.

17. The UAV of claim 14, wherein the instructions are such that the UAV is operable to receive, when the UAV-based position information is determined to be incorrect upon verifying the UAV-based position information by the UAV application server, one or more instructions for controlling the UAV to:
  correct a flight path of the UAV;
  prevent the UAV from entering a restricted flight space;
  keep a speed limit by the UAV; and/or
  land the UAV.

18. A method for verifying a geographical position of an unmanned aerial vehicle (UAV) connected to a cellular network, the method comprising a UAV application server residing in the cellular network:
  receiving UAV-based position information indicative of a current geographical position of the UAV determined by the UAV;
  triggering obtaining, from at least one entity of the cellular network and based on information associated with the UAV available in the cellular network, network-based position information indicative of a current geographical position of the UAV; and
  triggering verification of the UAV-based position information based on a difference between the UAV-based position information and the network-based position information.

19. A method for verifying a geographical position of an unmanned aerial vehicle (UAV) connected to a cellular network, the method comprising the UAV:
  determining a current geographical position of the UAV; and
  sending UAV-based position information indicative of the determined current geographical position of the UAV to a UAV application server residing in the cellular network to verify the UAV-based position information based on a difference between the UAV-based position information and network-based position information indicative of a current geographical position of the UAV obtainable through information associated with the UAV available in the cellular network.

* * * * *